(12) United States Patent
Casbeer et al.

(10) Patent No.: US 11,613,482 B2
(45) Date of Patent: Mar. 28, 2023

(54) METHODS AND SYSTEMS FOR MARINE WASTEWATER TREATMENT

(71) Applicant: De Nora Marine Technologies, LLC, Sugar Land, TX (US)

(72) Inventors: Dana Casbeer, Angleton, TX (US); Sehul Patel, Richmond, TX (US); Harold Childers, Houston, TX (US)

(73) Assignee: DE NORA MARINE TECHNOLOGIES, LLC., Sugar Land, TX (US)

( * ) Notice: Subject to any disclaimer, the term of this patent is extended or adjusted under 35 U.S.C. 154(b) by 0 days.

(21) Appl. No.: 17/621,053

(22) PCT Filed: Jun. 25, 2020

(86) PCT No.: PCT/US2020/039607
§ 371 (c)(1),
(2) Date: Dec. 20, 2021

(87) PCT Pub. No.: WO2020/264153
PCT Pub. Date: Dec. 30, 2020

(65) Prior Publication Data
US 2022/0332614 A1    Oct. 20, 2022

Related U.S. Application Data

(60) Provisional application No. 62/867,518, filed on Jun. 27, 2019.

(51) Int. Cl.
*C02F 3/12* (2023.01)
*C02F 1/00* (2023.01)
(Continued)

(52) U.S. Cl.
CPC ............ *C02F 3/1242* (2013.01); *C02F 1/001* (2013.01); *C02F 1/4674* (2013.01); *C02F 3/08* (2013.01);
(Continued)

(58) Field of Classification Search
CPC ...... C02F 3/1242; C02F 1/001; C02F 1/4674; C02F 3/08; C02F 2001/46128;
(Continued)

(56) References Cited

U.S. PATENT DOCUMENTS

| 4,179,347 A | 12/1979 | Krause et al. |
| 5,364,509 A | 11/1994 | Dietrich |
| 2015/0144554 A1 | 5/2015 | Josse et al. |

FOREIGN PATENT DOCUMENTS

| DE | 20317597 U1 | 3/2004 |
| GB | 1560833 A | 2/1980 |

(Continued)

*Primary Examiner* — Terry K Cecil
(74) *Attorney, Agent, or Firm* — D'Ambrosio & Menon, PLLC; Usha Menon (57) ABSTRACT

The invention relates to a system and method for treating wastewater onboard a marine vessel or other limited space application where wastewater treatment is required. In one embodiment of the invention, two polar opposite wastewater treatment processes are incorporated into the same treatment system. The system is a hybrid treatment unit that combines a conventional wastewater treatment using a moving bed biofilm reactor (MBBR) process-based biological treatment unit in combination with a novel electrochemical advanced oxidation process (EAOP) via an in-situ sodium hypochlorite recirculation. The clarified and disinfected effluent from this hybrid treatment unit is filtered to remove residual TSS. The filtered and disinfected effluent is discharged after dechlorination/neutralization. On-site maintenance disinfectant can be produced via the electrochemical/electrochlorination/electro-oxidation process and used for both treatment (Continued)

unit cleaning and disinfection. Additionally, the treatment unit provides a wholly separate stream of electrolysis generated disinfectant for surface disinfection purposes.

25 Claims, 6 Drawing Sheets

(51) Int. Cl.
    *C02F 1/467*     (2023.01)
    *C02F 3/08*     (2023.01)
    *C02F 1/461*     (2023.01)
    *C02F 103/00*     (2006.01)

(52) U.S. Cl.
    CPC ............... *C02F 2001/46128* (2013.01); *C02F 2103/008* (2013.01); *C02F 2201/4617* (2013.01); *C02F 2209/10* (2013.01); *C02F 2209/42* (2013.01); *C02F 2303/185* (2013.01)

(58) Field of Classification Search
    CPC ........ C02F 2103/008; C02F 2201/4617; C02F 2209/10; C02F 2209/42; C02F 2303/185; C02F 2001/46142; C02F 2201/4613; C02F 2203/008; Y02W 10/10
    See application file for complete search history.

(56) References Cited

FOREIGN PATENT DOCUMENTS

| | | |
|---|---|---|
| KR | 10-2008-0019975 A | 3/2008 |
| KR | 101224624 B1 | 1/2013 |
| KR | 101226547 B1 | 1/2013 |

METHODS AND SYSTEMS FOR MARINE WASTEWATER TREATMENT

TECHNICAL FIELD

The present invention relates to wastewater treatment and, in particular, to wastewater treatment and disinfection involving a hybrid wastewater treatment unit having a combination of a conventional biological moving bed biofilm reactor and an in-situ disinfectant recirculation process through an electrolytic cell.

BACKGROUND

The International Maritime Organization (the "IMO") is a specialized agency of the United Nations and it is the global standard-setting authority for the safety, security, and environmental performance of international shipping. MEPC.227(64) of the IMO and 33 CFR Part 159 of the United States (US) provide specifications for the testing of effluent standards and performance tests for sewage treatment plants and includes testing for pH, 5-day biochemical oxygen demand ($BOD_5$), chemical oxygen demand (COD), total suspended solids (TSS), thermotolerant coliform (TC), total nitrogen (TN), and total phosphorus (TP). IMO and United States Coast Guard (USCG) equivalent marine sewage discharge standards have also been adopted by Helcom, and regulatory authorities of countries/group of nations, such as Canada, European Union, China, Saudi Arabia, Brazil, Australia, and New Zealand. There is an ongoing regulatory need for treatment systems that can treat wastewater onboard offshore drilling platforms and marine vessels, such as, boats, yachts, research vessels, industry transport vessels and the like. Onboard treatment of wastewater in marine vessels and fish farmhouses poses unique challenges due to limited access to a municipal water treatment plant or dumping station or equivalent facility. The wastewater treatment apparatus utilized on these vessels should be economically viable, have a small equipment footprint and must comply with the IMO's and/or USCG's effluent discharge standards.

SUMMARY OF THE INVENTION

In accordance with one or more embodiments, the invention relates to a system and method for treating wastewater onboard marine vessels, offshore drilling/production platforms, aquaculture workboats that transport and distribute live fish and feed, and wastewater from industrial, agricultural, municipal and residential sources.

In one embodiment of the invention, two polar opposite wastewater treatment processes are incorporated into the same treatment unit. Unlike conventional systems which use one or the other, the invention involves a hybrid wastewater treatment unit having a combination of a conventional biological moving bed biofilm reactor (MBBR) and a novel electrochemical/electrochlorination advanced oxidation process (EAOP) via in-situ disinfectant recirculation through an electrolytic cell to produce a concentrated disinfectant solution. The disinfectant comprises sodium hypochlorite solution and/or hypochlorous acid. The concentrated disinfectant solution enhances elimination of pathogens and bacteria in the wastewater. The sodium hypochlorite solution, for instance, that is generated can be further utilized during in-situ maintenance/cleaning process of the wastewater treatment unit and can be used as an alternate disinfection solution for certain external surface cleaning via a separate discharge fitting in case of low supply of bleach, such as, due to a situation like a COVID-19 lockdown.

According to an embodiment, a compact system for treating a stream of wastewater includes a hybrid wastewater treatment unit. The wastewater treatment unit can be in fluidic connection with a wastewater storage/holding tank and a sludge storage tank or any sludge handling equipment or sludge processor. The wastewater can include pathogens, organic matter, suspended solid particulate matter, nitrogen, and phosphorus. The wastewater can be subjected to maceration by a macerator-type sewage transfer pump in the wastewater holding tank before it is piped to the wastewater treatment unit.

The wastewater treatment unit includes a first tank having a first chamber and a second chamber. The first chamber of the first tank includes a moving bed biofilm reactor (MBBR). The MBBR comprises a biological carrier media having a substantially high active surface area for biological microbes/microorganisms in the wastewater stream to attach and carry out a biological process for substantially reducing organic matter, suspended solid particulate matter, nitrogen, and phosphorus in the wastewater stream. The biological process involves at least one or more of a BOD reduction process, a nitrification process and a denitrification process. The biological carrier media can be positioned within a removable cage-like enclosure. The enclosure has a plurality of openings for allowing an influx of the wastewater stream. A bubble diffuser can be in fluid communication with the first chamber of the first tank. The bubble diffuser, in conjunction with an air blower, is configured to provide dissolved oxygen for the biological microorganisms. A column of air bubbles facilitates free movement of the biological carrier inside the first chamber of the first tank. Sludge, which includes dead microbes/microorganisms, generated in the first chamber of the first tank during the biological process can be discharged using an actuated sludge discharge valve. The sludge is piped to a sludge storage tank, or to a sludge processing equipment/system or to an alternate location.

The first tank also includes a second chamber. A pipe can be configured to transport an overflow from the first chamber of the first tank to a base of the second chamber of the first tank to allow settling of the suspended solid particulate matter therein. The pipe can be fitted with a screen for retaining the biological carrier media in the first chamber of the first tank. The second chamber of the first tank further comprises an air-lift return line for returning the portion of activated sludge/settled suspended solid particulate matter to the first chamber to the first tank which helps in maintaining the healthy microbial population in the first MBBR chamber. The second chamber of the first tank is fitted with a baffle plate for diverting a process stream comprising a substantially clarified effluent to a first chamber of a second tank.

The second tank is in fluid communication with the first tank. The first chamber of the second tank is configured for receiving a continually recirculating stream of an electrochlorinated/electrochemically produced disinfectant from the electrolytic cell. The second tank further includes a second chamber. The second tank further comprises a pipe configured to transport an overflow from the first chamber of the second tank to an upper surface of the second chamber of the second tank. The second chamber of the second tank comprises a filtration unit for removing residual suspended solid particulate matter present in the clarified overflow to provide a substantially filtered water for discharge. The filtration unit comprises a basket-like structure. Filtration media is placed inside the basket-like structure. The filtration unit further comprises a washable filter screen having a predetermined pore size.

The second chamber of the second tank further comprises a level transmitter to monitor influx of the wastewater stream into the wastewater treatment unit. The level transmitter is configured with pre-set setpoints that are factory configured to commence a wastewater treatment cycle.

The system further comprises a tank for storing a neutralization/dechlorination solution. In an embodiment, the dechlorination solution is a sulfite salts-based solution. An injection pump is configured to inject the dechlorination solution into the filtered water prior to discharge. The filtered and dechlorinated water is discharged overboard the marine vessel or offshore platform or to a receiving stream.

The wastewater treatment unit further includes an electrolytic cell. The electrolytic cell has a housing comprising an outer body and a slidable cover. The slidable cover provides convenient access to a plurality of enclosed electrodes. The electrodes include one bipolar electrode and two terminal electrodes. The housing further comprises one or more integral locking grooves/slides configured to align the cover with housing. The housing further includes one or more stoppers substantially proximal to a base of the housing, wherein the stoppers are configured to secure the cover such that it is prevented from slipping or dropping off. The housing further includes closures (either combination of inserts, bolts, washers, and O-rings Or Compression latches) to seal the cell cover to the outer body. The electrolytic cell can generate in-situ electro-chlorinated disinfectant, such as, sodium hypochlorite (NaOCl) from sodium chloride present in the seawater or sodium chloride/brine solution prepared using salt. This NaOCl can be used to oxidize organic matter and kill thermotolerant coliforms, virus, and other bacteria in the wastewater. The sodium hypochlorite solution is continually re-generated and recirculated to a first chamber of the second tank. Advantageously, the electrolytic cell can continue oxidation of seawater and generating sodium hypochlorite and recirculate disinfected wastewater in the unit for an adjustable time period even while no wastewater flow is entering the unit (or the unit is in a "Hold" mode). This can aid in maintaining a bacteria-free overboard discharge line while also disinfecting the effluent stream. In some instances, the chambers of the tanks may require cleaning and disinfection for extended storage. In these instances, a first stream of the generated electro-chlorinated disinfectant is diverted to clean and disinfect the treatment unit. In certain situations, where bleach or other disinfectant is not available onboard the marine vessel, a second stream of the electro-chlorinated disinfectant is diverted for surface disinfection purposes.

According to another embodiment, a process for treating a stream of wastewater involves: (A) providing a hybrid wastewater treatment unit, the treatment unit having: a first tank for receiving an inflow of the wastewater stream, the first tank comprising: a first chamber having a moving bed biofilm reactor (MBBR), the MBBR comprising a biological carrier media having a substantially high active surface area for biological microorganisms in the wastewater stream to attach and carry out a biological process for substantially reducing organic matter, suspended solid particulate matter, nitrogen, and phosphorus in the wastewater stream; and an electrolytic cell for generating an electro-chlorinated disinfectant, the electrolytic cell comprising: a housing with a slidable cover; one or more integral locking grooves/slides configured to align the cover with housing; and one or more stoppers for securing the cover substantially proximal to a base of the housing; and a second tank in fluid communication with the first tank; and (B) continually re-generating and recirculating the electro-chlorinated disinfectant to a first chamber of the second tank. A first stream of the generated electro-chlorinated disinfectant is diverted to clean and disinfect the treatment unit. A second stream of the electro-chlorinated disinfectant is diverted for surface disinfection purposes. The process further comprises monitoring an inflow of the wastewater stream. A treatment cycle is commenced and/or stopped when a predetermined setpoint is reached in a second chamber of the second tank. The process further comprises installing a filtration unit within a mouth/opening to the second chamber of the second tank, wherein the filtration unit is configured to entrap residual (TSS) in the process flow from the first chamber of the second tank to provide a substantially filtered water for discharge. The process further comprises dechlorinating the filtered water prior to discharge.

Objects, advantages and novel features, and further scope of applicability of the present invention will be set forth in part in the detailed description to follow, taken in conjunction with the accompanying drawings and claims, and in part will become apparent to those skilled in the art upon examination of the following, or may be learned by practice of the invention. The objects and advantages of the invention may be realized and attained by means of the systems and processes particularly pointed out in the following description.

BRIEF DESCRIPTION OF THE DRAWINGS

The invention will be described in further detail below and with reference to the attached drawings all of which describe or relate to units, systems and methods of the present invention. In the figures, which are not intended to be drawn to scale, each similar component that is illustrated in various figures is represented by a like numeral. In the figures.

DETAILED DESCRIPTION OF THE INVENTION

Depending on the context, all references below to the "invention" may in some cases refer to certain specific embodiments only. Various terms are used herein. To the extent a term used in a claim is not defined below, it should be given the broadest definition persons in the pertinent art have given that term as reflected in printed publications and issued patents at the time of filing.

The embodiments of the present invention can be used to treat wastewater from marine vessels, including, ships, boats and yachts, offshore platforms, floating offshore installations (i.e., FPSO), aquaculture workboats/fish farmhouses, or wastewater generated by industrial, commercial, agricultural, and municipal/residential sources, having solid pollutants of biodegradable and non-biodegradable material. As used herein, the term "wastewater" can include any water to be treated such as black water and gray water and combined black water and gray water. The terms "wastewater", "sewage" and "marine wastewater" are used interchangeably in this document.

Marine wastewater generally includes raw sewage, black water, gray water and combinations thereof. The term "black water" refers to water contaminated with human waste that comprises coliform and other bacilli. The term "gray/grey water" refers to used water absent human waste, such as water from galley, laundry, sinks, dishwashers, and showers. Generally, marine wastewater is composed of both toxic and non-toxic organic and inorganic contaminants, micro and macro suspended solid contaminants comprising cellulose, sand, grit, human biomass, and emulsions and gases. The pollution potential of combined black water and gray water is indicated by several wastewater parameters, biochemical oxygen demand (BOD), chemical oxygen demand (COD), thermotolerant coliform bacteria, and suspended solids (SS) being the major ones. A commonly measured constituent of wastewater is the biochemical oxygen demand, or BOD. The amount of oxygen required for microbes to break down organic contaminants is known as the biochemical oxygen demand or BOD. The five-day BOD, or $BOD_5$, is measured by the quantity of oxygen consumed by microorganisms during a five-day period and is the most common measure of the amount of biodegradable organic material in, or strength of sewage. Sewage high in $BOD_5$ can deplete oxygen in receiving waters, causing fish kills and ecosystem changes. Chemical oxygen demand (COD) is the total amount of oxidizable organics (biodegradable and non-biodegradable and both dissolved and particulate), measured by the amount of oxygen in the form of oxidizing agent required for the oxidation of organic matters by heating the sample in strong sulfuric acid containing potassium dichromate. Total organic carbon (TOC) is the amount of carbon found in an organic compound and is often used as a non-specific indicator of water quality. As used herein, the term "organic matter" includes BOD, COD and/or TOC. The wastewater may further comprise suspended solids. Total Suspended Solids, TSS, is a measure of the total solid particles that are suspended in the wastewater. TSS may be organic in nature and can serve as safe havens for harmful bacteria and other microorganisms.

Figure 1A:
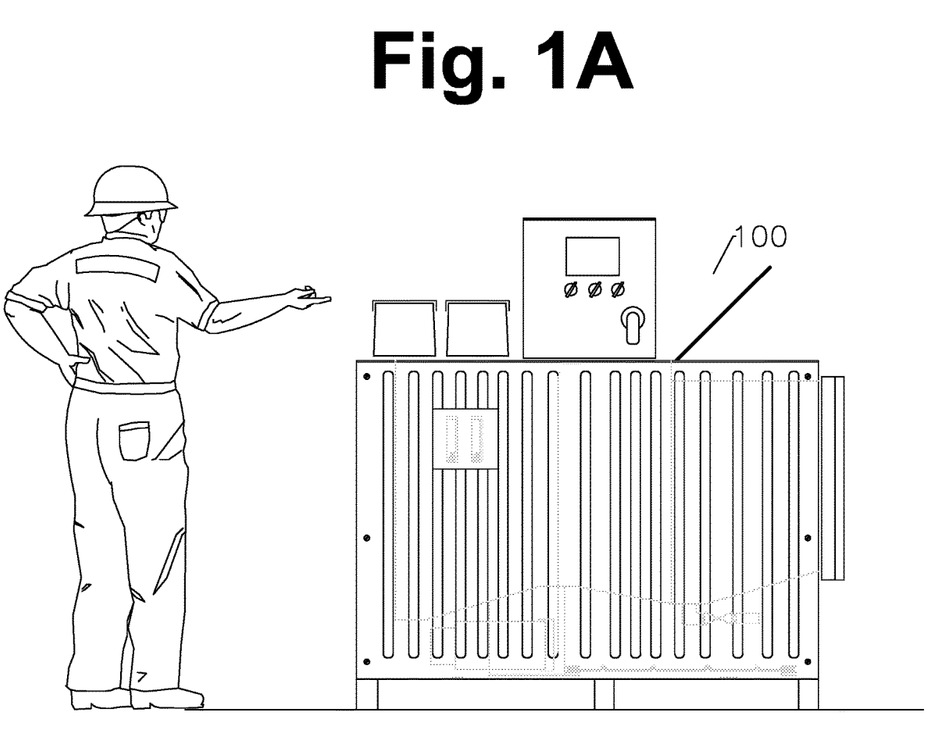
FIGS. 1A-1B depict a wastewater treatment unit according to an embodiment.
Figure 1B:
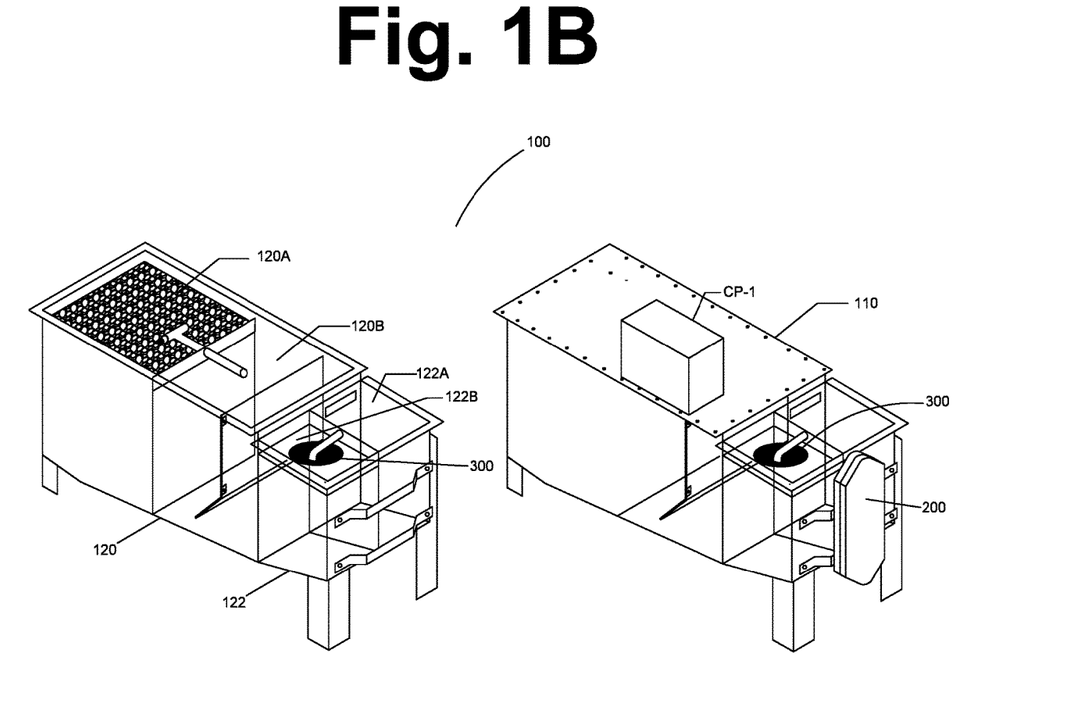

In an embodiment, the present invention relates to a system for treatment of wastewater. As described earlier, the wastewater can include pathogens, organic matter, and suspended solid particulate matter. FIGS. 1A and 1B illustrate a specific, non-limiting embodiment, exemplifying a compact wastewater treatment unit 100. The wastewater treatment unit can be configured for treating wastewater onboard a marine vessel (not shown). Although the exemplary embodiments are described with reference to treatment onboard a marine vessel (or vessel), it is understood that the embodiments of the present invention can be used to treat wastewater generated on an aquaculture workboat/fish farmhouse, an offshore drilling platform, a floating offshore installation, and from industrial, municipal or residential sources. As shown in FIG. 1B, the wastewater treatment unit 100 includes four treatment chambers 110. In one embodiment, the wastewater treatment unit includes a first tank 120 having a first chamber 120A and a second chamber 120B and a second tank 122 having a first chamber 122A and a second chamber 122B. The wastewater treatment unit 100 further includes an electrolytic (EC) cell 200 and a filtration unit 300.

Figure 2:
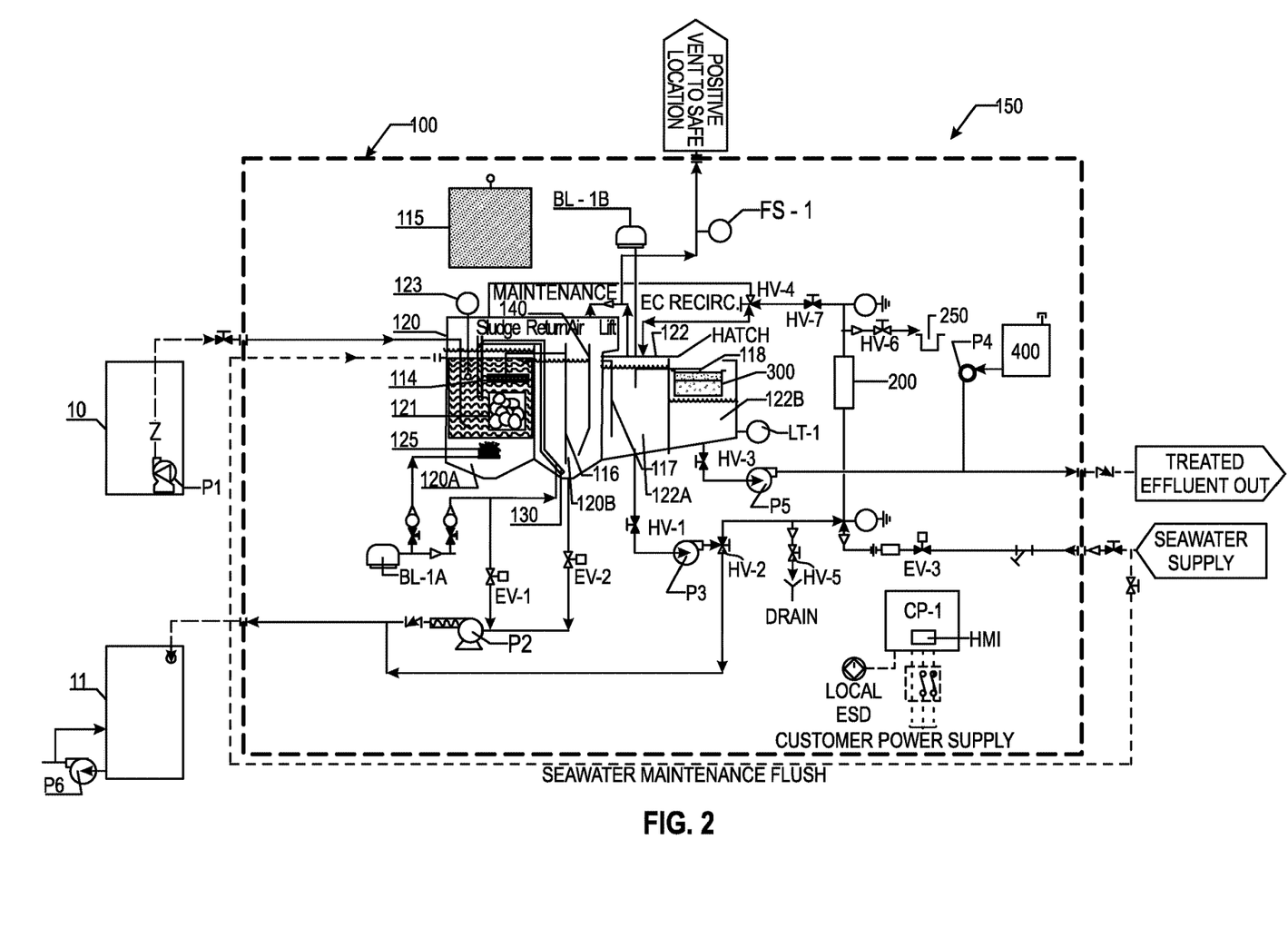
FIG. 2 depicts a schematic illustration of a wastewater treatment system according to an embodiment.

FIG. 2 illustrates a wastewater treatment system 150. The wastewater treatment system 150 includes a hybrid wastewater treatment unit 100 (hereinafter "unit 100") in fluidic connection with a wastewater holding/storage/collection tank 10 and a sludge storage/collection/holding tank 11. The unit 100, the wastewater holding tank 10 and the sludge storage tank 11 are compact units that occupy a small footprint making them ideal for use in marine vessels. The unit 100 may be placed in-line and downstream from the wastewater holding tank 10. The unit 100 can be conveniently mounted on a skid (not shown). The skid may comprise a compact steel base frame.

A typical cyclic operation aboard the marine vessel occurs when untreated wastewater is pumped into the unit 100 from the wastewater holding tank 10 using a sewage transfer pump P1. The sewage transfer pump P1 can include a macerator for finely grinding large solid particulate matter suspended in the wastewater to reduce their particle size. The macerator can eliminate the need for costly screen filters that require very high maintenance and untreated solids disposal. The untreated macerated wastewater stream contains smaller particles thereby facilitating more efficient treatment and clog-free operation within the unit 100.

The unit 100 can include two tanks 120 and 122 having a total of four chambers/compartments. For illustration purposes, the first tank 120 is depicted as having two chambers 120A and 120B and the second tank 122 is depicted as having two chambers 122A and 122B. The chambers may be defined by a partition in the respective tanks. However, it is understood that a single tank having four chambers can also be used and is within the scope of the invention. The tanks and partitions can be constructed from a light weight metallic and/or non-metallic material. The macerated wastewater stream is routed from the wastewater holding tank 10 into the first chamber 120A of tank 120. A compact moving bed biofilm reactor (MBBR) can be positioned inside the first chamber 120A. The first tank includes a raw wastewater connection line, a biological carrier media with a very high active surface area, a fine/medium bubble diffuser with air piping, and an air-lift/activated sludge return line.

The MBBR comprises a combination of conventional activated sludge and a biological media carrier ("carrier") to highly effectively treat the wastewater in the first chamber 120A. In an embodiment, the carrier has predetermined characteristics. For instance, the carrier can include a plurality of highly fine, porous, floating, plastic, thin, biochips 121. The carrier 121 may be round in shape. However, the carrier can be oval or have any other suitable shape. In one embodiment, the carrier 121 can have an average thickness of approximately 0.1-1.5 mm. The carrier 121 can have a density that is substantially similar to or slightly lower than that of water. When the carrier 121 is added in the MBBR/first chamber 120A, due to lower material density of 0.95 $g/cm^3$, it floats on the top of the first chamber 120A. But, as the bacterial colonies start developing on this carrier 121, the material density of carrier 121 increases and thus they start freely flowing in the first chamber 120A. The carrier 121 can provide a very high active surface area (>4,000 $m^2/m^3$, which is up to 6-7 times greater than any other commercially available media) for biological microorganisms/bacteria to attach and grow (that is, for biofilm development). Due to the use of a very high active surface area floating media 121 in the MBBR, the first chamber 120A can be sized significantly smaller than a traditional MBBR treatment tank. The carrier 121 is configured to facilitate the diffusion of oxygen and the wastewater from both sides into the carrier to a depth of 0.3-1.0 mm. Consequently, the carrier 121 can be held active and will not die due to clogging.

In one embodiment, the carrier 121 can be placed in a cage-like enclosure 115. The enclosure can be made of a light weight metallic and/or non-metallic material. The enclosure 115 can include a plurality of openings to provide a passage to the wastewater stream. The enclosure 115 with the carrier 121 can be then positioned inside the first chamber 120A. The enclosure 115 can be configured to be removable which allows flexibility in isolating the carrier 121 containing healthy biofilm when there is a need to flush/clean the unit 100 prior to extended storage or for system maintenance. Once the unit flushing/cleaning is finished, the enclosure 115 can be placed back inside the chamber 120A. A continuous airflow is provided to keep suspension of the carrier 121 and maintain the desired dissolved oxygen concentration in the chamber 120A. This allows to maintain the active biofilm developed on the carrier 121.

Air can be supplied to the carrier 121 using a fine/medium bubble diffuser 125 located proximal to the base of the first chamber 120A. Coarse-bubble diffuser typically require less maintenance than fine-bubble diffuser. Fine-bubble diffuser have better oxygen transfer efficiency (OTE) than coarse-bubble diffuser. Air is supplied to the bubble diffuser 125 by a small and quiet linear diaphragm air pump/blower BL-1A. The blower BL-1A can be located outside the first tank 120. A biofilm grows on the surface of the carrier 121. This causes the carrier 121 to develop a neutral buoyancy which allows it to freely tumble in a column of the supplied air. Due to this tumbling effect, the carrier 121 is kept clean and it assures that only strong, healthy bacteria are present on the biofilm. The diffuser 125 facilitates production of controlled-size bubbles. This can serve two purposes. First, the bubbles provide required dissolved oxygen ("DO") to the bacteria which is required for them to effectively break down the organic matter of the incoming wastewater into the first chamber 120A. Second, a rising column of air bubbles provides continuous agitation which can effectively cause the carrier 121 to move freely inside the first chamber 120A. This can ensure that the incoming wastewater stream has ample opportunity to contact the carrier 121. This aeration action occurs continually whenever the unit 100 is being used.

A biological treatment process occurs in the first chamber 120A. The wastewater can include organic nitrogen from amino acids, dead cells, etc. The microorganisms, such as, bacteria in the wastewater thrive at the protected surface of the carrier 121 where oxygen gradients create aerobic, anoxic, and anaerobic layers allowing simultaneous nitrification and denitrification processes in the first chamber 120A. During these processes, ammonium nitrogen is oxidized to nitrite and then to nitrate by complete nitrification, and subsequently nitrate is reduced to nitrogen gas by denitrification. The biological process also results in the reduction of BOD. Thus, a reduction of the organic matter, total suspended solids/solid particular matter, and total nitrogen in the macerated wastewater stream commences in the first chamber 120A.

In one embodiment, the first chamber 120A can also include an optional DO probe/sensor/meter 123. The DO meter 123 can provide real-time DO concentration reading in the first chamber 120A during the normal operation. It is important to maintain a predetermined DO concentration in the first chamber 120A for healthy microbial population on the biofilm.

The biological treatment process in the first chamber 120A produces sludge that must be removed to maintain a healthy microbial population and an effective and compliant treatment unit 100. The sludge can include dead microbes/microorganisms. The first chamber 120A can be fitted with an actuated sludge discharge valve EV-1. The valve EV-1 can be controlled by a programmable logic controller (PLC). When required, valve EV-1 can be manually or automatically actuated/opened and a sludge transfer pump P2 can be used to drain the waste sludge/dead microorganisms from the first chamber 120A to the sludge storage tank 11, or to a sludge processor, or to an alternate location. The sludge collected during the treatment can be stored in the tank 11 for later disposal.

The process flow is piped through an overflow pipe 116. When it reaches a point just above the pipe 116, it produces a slightly higher head pressure on the liquid itself thereby forcing it through the pipe 116 and over into a second chamber 120B of the first tank 120. The first end of pipe 116 is positioned in proximity to an upper surface of the first chamber 120A while the second end of pipe 116 is positioned in proximity to the base/bottom of the second chamber 120B. The second chamber 120B is configured as a clarification or settling tank/chamber. This process facilitates settling of any TSS carryover material from the first chamber 120A. The TSS material from the first chamber 120A can be allowed to flow down in the second chamber 120B via gravity. Because the flow-through velocity of the wastewater stream is very low, about 0.5-1.5 m/hr, it can facilitate a settling of TSS particles at the bottom of the second chamber 120B.

The first end of the overflow pipe 116 is fitted with a catch/retention screen 114 in the first chamber 120A. The screen 114 includes a plurality of pores that have a diameter that is less than that of the carrier media 121. Therefore, the screen 114 can prevent any carryover of the carrier 121 into the second chamber 120B, which allows first chamber 120A to retain carrier media 121 with healthy microbial population to continuously treat the incoming wastewater. The screen 114 also avoids carrier 121 leaving from the first chamber 120A to next chambers and eventually overboard to sea from the treatment unit 100 and plugging of the various pumps in the system.

The second chamber 120B can also be fitted with a sludge discharge valve EV-2 that can be controlled by a PLC. EV-2 can be either manually or automatically actuated, when required, to remove any sludge build-up in the second chamber 120B. When valve EV-2 is opened, a sludge transfer pump P2 drains the sludge from the second chamber 120B to the sludge storage tank 11, or to a sludge processor, or to an alternate location.

An 'air-lift'/activated sludge return pipe 130 is fitted in the second compartment 120B. A blower BL-1A injects a small amount of controlled air via a small airflow meter with an adjustment valve into the bottom of this air-lift line 130. This causes the accumulation of a larger bubble of air to fill and rise to the top of the air-lift pipe 130 thereby pushing any liquid on top of the air bubble over and back into the first tank chamber 120A through the horizontal section of the air-lift/activated sludge return pipe 130. This causes an effective and continuous recirculation of a portion of the settled activated sludge/TSS particles that can be pumped back through air-lift return line 130 into the first chamber 120A for further treatment. This process helps in maintaining the healthy microbial population in the first MBBR chamber.

The residence time of the fluid in (tank 120A and) tank 120B is determined by the inlet wastewater flowrate to the system 150. A hydraulic overflow occurs to the liquid in this chamber 120B when a hydraulic head level is reached, and it overflows into the third tank 122A. The second chamber 120B can also be fitted with a baffle plate/up-flow pipe arrangement 140. The baffle plate 140 is configured as a bolt-in partition and is made of a suitable light weight metallic and/or non-metallic material. The substantially clarified process flow is diverted upward through the baffle plate 140. The baffle plate 140 serves as a flow diverter for the reduced TSS process stream as hydraulic head pressure in 120B forces it into the first chamber 122A of the second tank 122. The reduced TSS process stream exits the second chamber 120B near the top surface and is directed to a location proximal the base of the first chamber 122A of the second tank 122 via an external downpipe 117.

The first chamber 122A of the second tank 122 is an electrochlorination/electrochemical recirculation chamber. The reduced TSS process stream is received in this chamber 122A along with a stream of sodium hypochlorite generated by an electrolytic cell 200, as described below. Chamber 122A can be fitted with an internal overflow pipe 118. The overflow pipe is fitted just beneath a predetermined water level in chamber 122A to allow the clarified and disinfected/electrochlorinated process stream to flow over into the second chamber 122B of the second tank 122 when a predetermined level is reached.

As shown in FIGS. 1B and 2, the second chamber 122B of the second tank 122 includes a filtration unit 300. The filtration unit 300 is configured to cover an opening/mouth of the second chamber 122B. Any remaining TSS particulates from the overflow from the first chamber 122A are captured by the filtration unit 300 as the clarified and disinfected process stream falls through and fills the second chamber 122B.

The second chamber 122B includes a level transmitter LT-1 to monitor the incoming water flow. The level transmitter LT-1 is configured to detect pre-set setpoints, namely, a low (to stop the operation of the unit), a high (to start the operation of the unit), and a high-high (warning/shutdown alarm to alert an operator) level setpoints. The high-high liquid level point is a liquid level height in the second chamber 122B where the level is above a predetermined setpoint for the normal operation of the unit 150. The level transmitter LT-1 sends a shutdown/warning alarm/signal to the unit's PLC to shut down the unit 150 and to de-energize the sewage transfer pump P1. When the water in the second chamber 122B reaches the high level, a dilution blower BL-1B energizes and airflow is confirmed at the air/vent flow switch FS-1. The hydrogen gas is generated as a by-product when sodium hypochlorite is generated by an electrolytic cell 200. The blower BL-1B pulls hydrogen gas from the first chamber 122A, dilutes it well below 25% of LEL of hydrogen in air (LEL of hydrogen in air is 4%) or well below 1% of hydrogen in air, and sends it in the positive vent line to a safe location. The flow switch FS-1 can be set with a low flow setpoint as a shutdown alarm for the unit 100.

Once airflow is confirmed by switch FS-1, a recirculation pump P3 is energized, a seawater electric valve EV-3 opens up, and an electrolytic cell 200 is energized to produce sodium hypochlorite from the seawater/brine solution. A manual 2-way valve HV-1 is kept in open position during the normal operation. A manual 3-way valve HV-2 is kept open towards a line to the EC cell in normal operation. The position of this HV-2 valve can be changed manually towards a drain line when the first chamber 122A is required to be drained. After this, the sodium hypochlorite collected in the first chamber 122A of the second tank 122 can be (re)circulated using the recirculation pump P3 through a manual 3-way valve HV-2 and then through the electrolytic cell 200, a manual 2-way valve HV-7, and a manual 3-way valve HV-4 back to the first chamber 122A. A manual 3-way valve HV-4 is kept open towards a line to the first chamber 122A in normal operation. A manual 2-way valve HV-7 is kept in open position during normal operation.

An effluent overboard pump P5 can be configured to be energized at this time. Pump P5 can begin pumping the treated effluent from the second chamber 122B into a treated effluent discharge line to the sea (or overboard the vessel). In normal operation, a manual 2-way valve HV-3 is kept in open position. Additionally, a chemical injection diaphragm/peristaltic pump P4 can also be energized at the same time.

A neutralization/dechlorination chemical/solution can be stored in tank 400. The chemical injection pump P4 can be configured to inject the dechlorination solution in the clarified and electrochlorinated/electrochemically generated effluent discharge line. The neutralization/dechlorination solution can include sulfite salts-based solution, without limitation, sulfur dioxide, sodium sulfite, sodium bisulfite, sodium metabisulfite, sodium thiosulfate and combinations thereof. The discharged effluent can be dechlorinated by injecting a predetermined optimal amount of the dechlorination solution prior to its discharge to the sea to ensure that chlorine-free effluent is discharged to the sea. The injection of the dechlorination solution ensures that the total residual chlorine in the discharge stream stays below 0.5 mg/L discharge limit, as stipulated by IMO MEPC.227(64) and US 33 CFR Part 159 standards.

The electrolytic treatment process via the electrolytic cell 200 continues until the level in the second chamber 122B of the second tank 122 reaches the low setpoint level of the level transmitter LT-1. At this point, the effluent overboard pump P5 is deenergized. The electrolytic cell 200 continues oxidation of seawater (and generating) sodium hypochlorite and the recirculation pump P3 continues to operate and recirculate disinfected wastewater into the first chamber 122A of the first tank 122 for an adjustable time period which could last up to an hour. This time period can be set from HMI located on the control panel CP-1. This additional oxidation treatment offers a higher degree of wastewater treatment while no incoming marine wastewater flow is entering the unit 100. This additional 'shock dosing' of the discharge stream can aid in maintaining a bacteria-free overboard discharge line while also disinfecting the effluent fluid. At the end of the adjustable time period, the electrolytic cell 200 and the recirculation pump P3 are deenergized. The blower BL-1B remains energized for an additional period of time (such as, three-ten minutes) in order to clear any remaining gases from the second chamber 122B of the second tank 122.

A manual 2-way valve HV-5 is provided between the recirculation pump RP-1 and the electrolytic cell EC-1 which is kept in closed position during the normal operation. This valve HV-5 can be manually open to drain the EC cell during cleaning or replacement of electrodes.

The electrolytic cell 200 is configured to provide several advantages over conventional electrolytic cells including: lower cost, compact size, lighter weight, facilitation of quick and easy opening of the cover to access the electrodes. The cell 200 is also sized electrically to match a small switching power supply housed in a small control panel CP-1. Now referring to FIGS. 2 and 3A-3B, the electrolytic cell 200 is specifically designed for wastewater treatment in a small marine vessel. The electrolytic cell 200 can be used as part of the unit 100. However, it is also configured to be used as part of any other sewage treatment system.

Figure 3A:
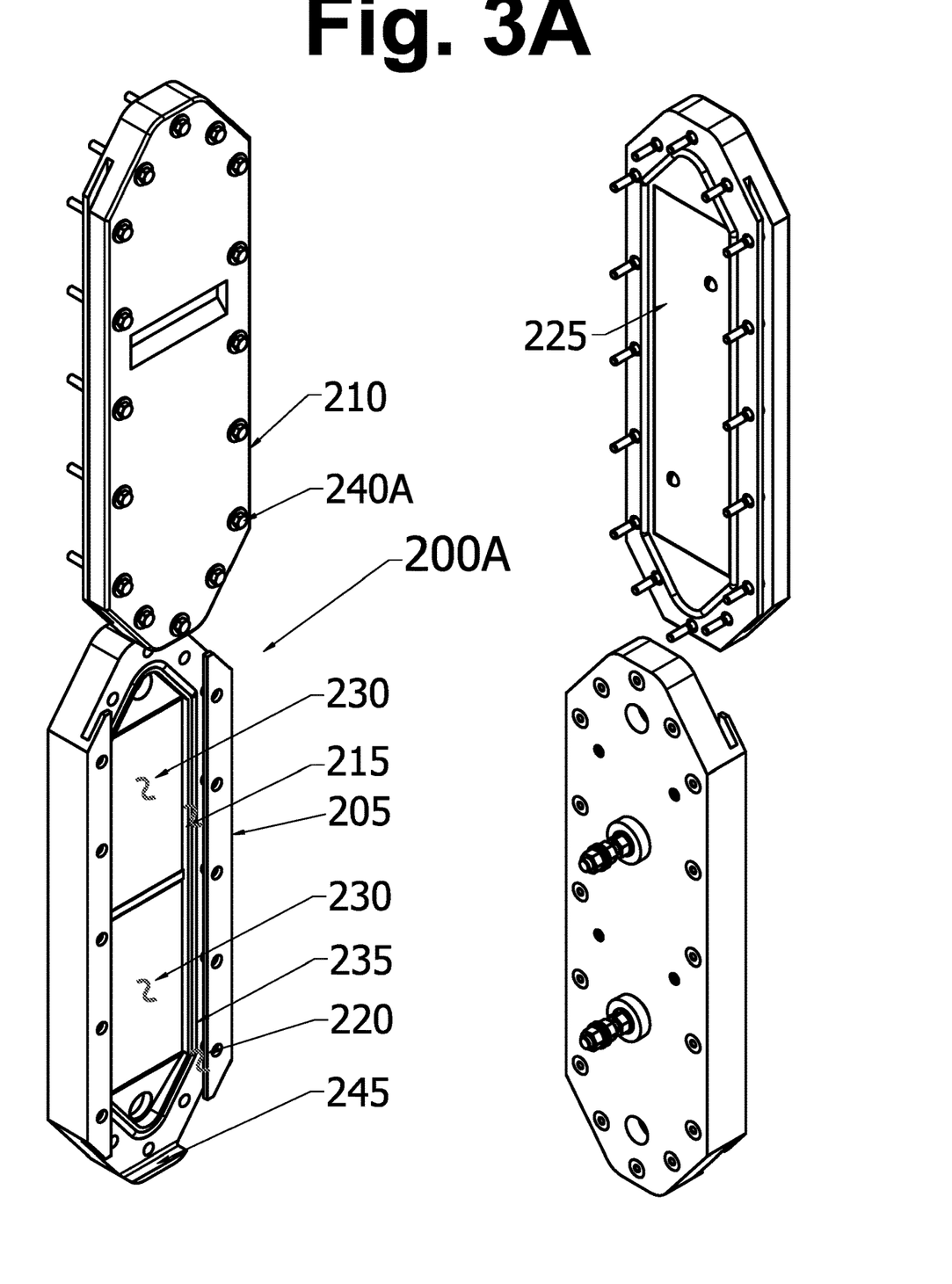
FIG. 3A depicts a front and a back view of an electrolytic cell according to an embodiment.
Figure 3B:
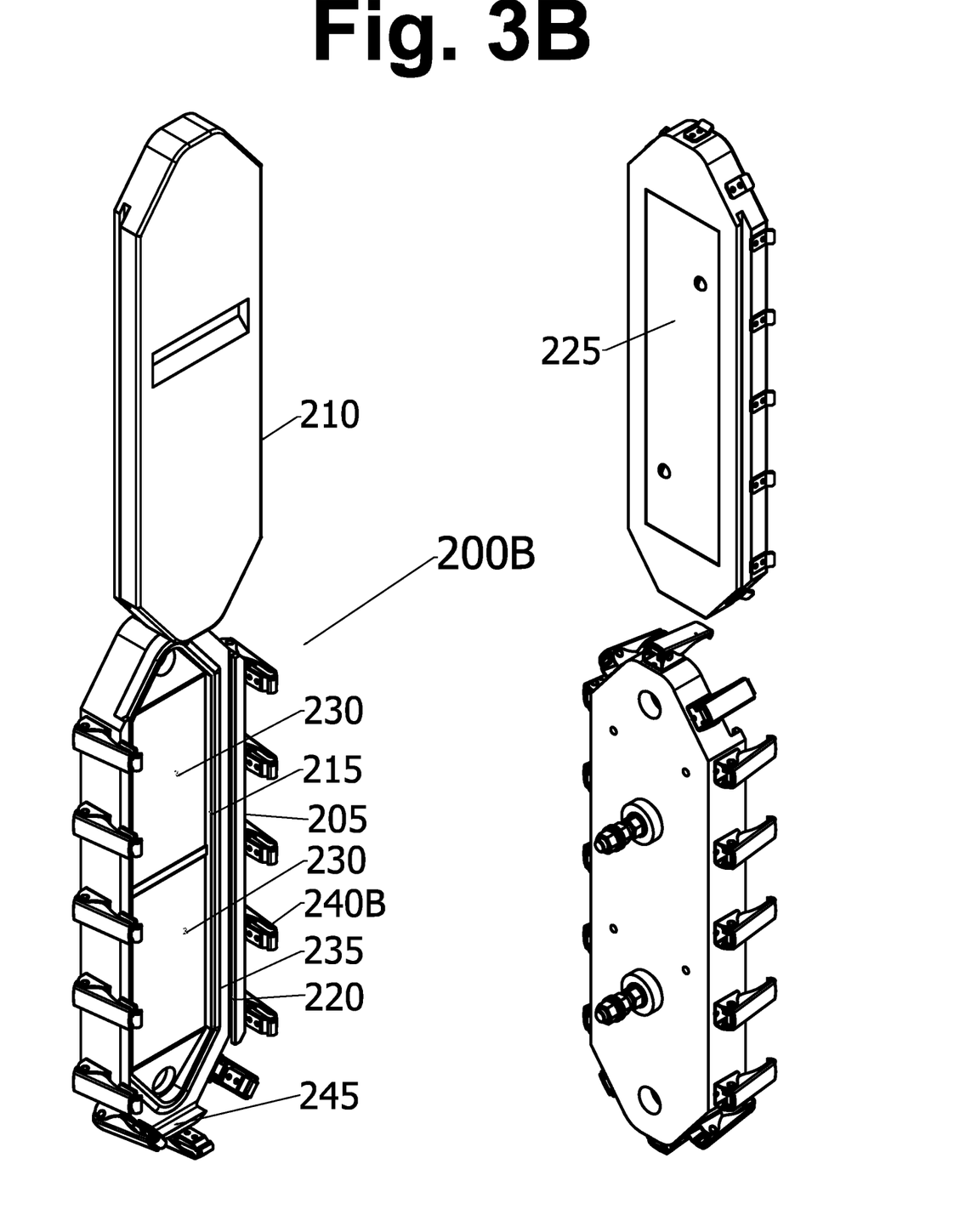
FIG. 3B depicts a front and a back view of an electrolytic cell according to another embodiment.

Now referring to FIG. 3A and FIG. 3B, the electrolytic cell 200A or 200B (together cell "200") includes a compact outer body/shell/housing 205. The housing 205 can be made of polyvinyl chloride (PVC) or chlorinated polyvinyl chloride (CPVC) or a suitable similar material which allows superior corrosion resistance and a lightweight assembly.

In an embodiment, the electrolytic cell 200 include one bipolar electrode 225 and two terminal electrodes 230. These electrodes are DSA® titanium anodes coated with a mixed metal oxide composition comprising different elements such as iridium, ruthenium, platinum, rhodium, tantalum, and tin. A top layer of tin can be applied on the electrode coating to create an overpotential. As the overvoltage increases in the electrolytic cell 200, it produces free hydroxyl radicals (•OH) (oxidation potential (OP): 2.8 V) and hydrogen peroxide ($H_2O_2$) (OP: 1.8 V) which are powerful oxidant species compared with potassium permanganate (OP: 1.7 V), chlorine dioxide (OP: 1.5 V), and chlorine (OP: 1.4 V). The wastewater treatment process of this invention which produces the above discussed chemical species for disinfecting the wastewater is called an electrochemical advanced oxidation process (EAOP) herein. The EAOP can be successfully applied to degrade/destroy wastewater containing naturally occurring toxins, organic, and inorganic contaminants, pesticides, and other deleterious contaminants like nanomaterials.

The electrodes can be arranged in a pocket/compartment 215 in the housing. This arrangement can ensure a plug free operations and oxidation path. The electrodes are fitted into this recessed pocket 215 within the cell's internal flow path and since the surface of the electrodes is configured to be at the same elevation as the surrounding PVC cell body material, the flow path is essentially free of any obstructions and discourages any potential buildup of debris that could plug the cell. The electrodes are configured to have a reverse polarity coating. Current/polarity reverse electrolysis can be used for "self-cleaning" of the mixed metal oxide coated titanium anodes. The electrodes can be arranged to be individually replaceable. The electrolytic cell 200 incorporates a DC current reversal feature which provides an internal self-cleaning of the electrodes. This feature minimizes the manual cell electrodes cleaning by a diluted acid (such as, muriatic acid or citric acid/vinegar).

The housing 205 includes a slidable front cover 210. The cover 210 can conveniently slide up and off the housing 205, as needed. This allows for quick and easy access to the electrodes which can facilitate ease of cleaning and routine maintenance. The housing 205 comprises one or more integral locking grooves/slides 220 that keep the cover 210 aligned and eliminates the need for hinges. The housing 205 can also include one or more stoppers 245. The stoppers 245 are located substantially proximal to the base to secure the cover 210 and prevent it from sliding/dropping off the housing.

The electrolytic cell 200A can include closures 240A to seal the cell cover 210 to the outer body 205. As shown in FIG. 3A, the closures 240A can include inserts, bolts, washers, and O-rings. In another embodiment, as shown in FIG. 3B, the closures 240B can include compression latches.

The electrolytic cell 200 also includes O-ring 235 which provides a positive seal against any liquid leakage when it is in under normal operation. O-ring 235 is compressed against the slidable front cover 210 when the closures are engaged, creating the seal. The electrolytic cell 200A or 200B (together cell "200") is, therefore, configured to provide easy and quick access to the electrodes for routine maintenance by sliding off front cover 210.

As shown in FIG. 2, a stream of raw sea water is routed to the electrolytic cell 200. (It is noted that a brine solution can be used instead of seawater.) During the treatment cycle, the electrodes are energized under direct anodic and cathodic current. A small, inexpensive switch/switching/switched mode power supply (SMPS) can be used to provide DC electrical power (i.e., 15 VDC and 0~50 ADC) to the cell 200. In this condition, partial electrolysis of sodium chloride (NaCl) contained in the sea water occurs. The aqueous solution of NaCl, which is completely dissociated as sodium ion ($Na^+$) and chloride ion ($Cl^-$). The chloride ion ($Cl^-$) reacts at the anode to generate chlorine ($Cl_2$) gas due to elemental potential in the cell 200. This chlorine is rapidly hydrolyzed to form hypochlorous acid (HOCl) and hypochlorite ion ($OCl^-$). While the sodium ion reacts instantaneously with water in the cell 200 to form sodium hydroxide (NaOH). The hydrogen gas is evolved at the cathode with the corresponding formation of hydroxide ions ($OH^-$). This gas does not recombine with any other chemical species; thus, it becomes a gas-phase waste by-product. The sodium hydroxide and hypochlorous acid react to form sodium hypochlorite (NaOCl). Some of the HOCl and $OCl^-$ reacts with the bromine in the sea water to form hypobromous acid (HOBr) and hypobromite ion ($OBr^-$), respectively. HOCl, $OCl^-$, HOBr, and $OBr^-$ act as disinfecting agents for treating the wastewater. This results in oxidization of known pathogens and bacteria (i.e., thermotolerant coliform).

In one aspect, the hydrogen ($H_2$) byproduct of the sodium hypochlorite generation is separated in the first chamber 122A of the second tank and vented to a safe location externally.

Advantageously, and unique to this system 150, the sodium hypochlorite stream, generated by the electrolytic cell 200, is continually recirculated through the cell 200 to facilitate a higher rate of oxidation and thereby, an extended disinfection cycle for the pathogens/bacteria. Furthermore, it allows the unit 100 to continue the electrolysis action/treatment even during the time when there is no additional wastewater being introduced into the unit 100 itself. This feature promotes a higher concentration 'shock' dose as newly introduced wastewater enters the compartment 122A when the unit 100 begins receiving wastewater flow again. This unique feature also allows for sodium hypochlorite to be generated aside from the treatment process for use in maintenance cleaning of the system if required via a 3-way valve HV-4. In certain embodiments, the sodium hypochlorite that is generated can be collected and stored as a disinfectant for use onboard the marine vessel (such as, to clean the surfaces onboard the vessel) using a discharge fitting 250 and a manual 2-way valve HV-6.

The cell 200 is configured to provide several advantages over conventional electrolytic cells including: lower cost, compact size, lighter weight, facilitation of quick and easy opening of the cover to access the electrodes. The cell 200 is also sized electrically to match a small switching mode power supply housed in a small control panel CP-1. Since sodium hypochlorite/hypochlorous acid can be used to disinfect various surfaces, a side stream of the sodium hypochlorite/hypochlorous acid generated by the cell 200 can be separated using a discharge fitting 250 and a manual 2-way valve HV-6 without affecting the disinfection of the wastewater. A manual 2-way valve HV-6 is kept in closed position during the normal operation.

The various operations of the unit 100 can be logically controlled by a relatively inexpensive electrical/control panel CP-1. This control panel CP-1 can include a human machine interface (HMI) which provides high-resolution, widescreen display for clear viewing of unit information. This HMI display provides an overview function that allows for all unit functions to be viewed on a single screen. The panel CP-1 and the HMI set-up also allows for remote monitoring capabilities for viewing system information on offsite computers.

Figure 4:
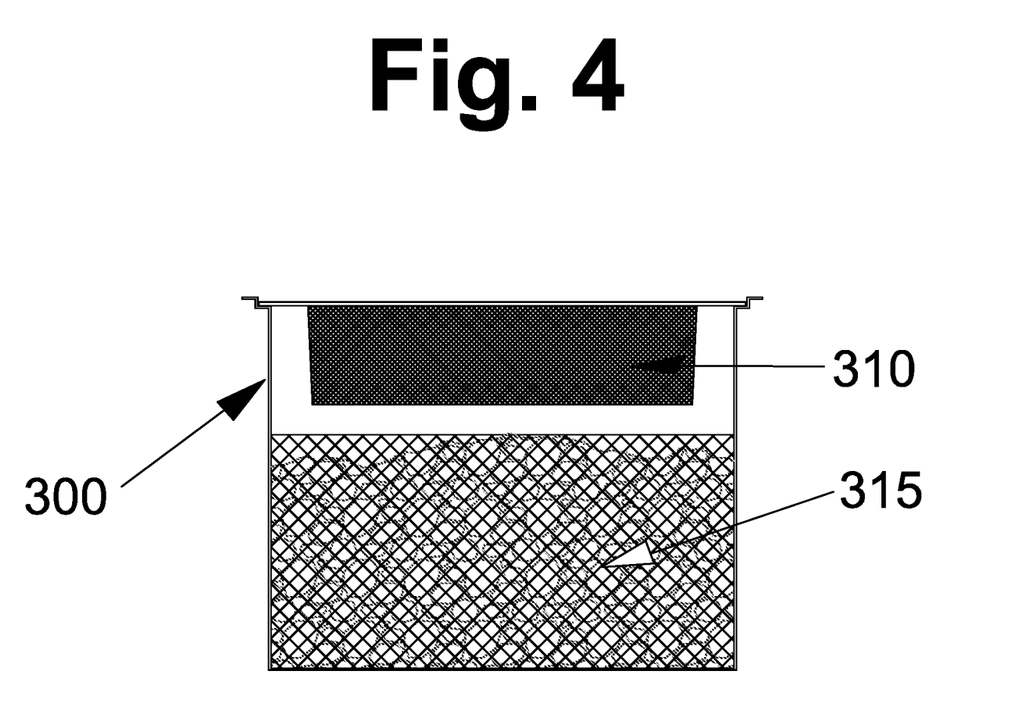
FIG. 4 depicts an exemplary filtration unit containing strainer/filter screen and filter media according to an embodiment.

As described earlier, following the electrolysis of the wastewater stream, the electrolyzed flow is routed into the second chamber 122B of the second tank 122 via hydraulic overflow where the flow proceeds through a filtration unit 300 to effectively capture any residual suspended solids. As shown in FIGS. 2 and 4, the filtration unit 300 can be mounted on an upper portion of the second chamber 122B. The filtration unit 300 can be configured in a basket-like structure/configuration. The filtration unit 300 comprises a removeable filter screen element 310 that has the capability to be washed and reused.

The filtration unit 300 further includes activated carbon, crushed activated glass, sand or other suitable filtration media 315 to trap particulates and thereby meet or exceed IMO MEPC.227(64) compliant effluent/treated water to be discharged from the system 150 to the sea/overboard (after dechlorination).

The filter screen 310 is configured to have a predetermined pore size to provide final polishing/filtration in order to further reduce TSS concentration and allow for the clear, IMO MEPC.227(64) compliant effluent/treated water to be discharged from the unit 110 to sea (after dechlorination). The filter screen 310 is configured to operate in a moderate to high sodium hypochlorite recirculating operation of this invention.

The filtration unit 300 is monitored on a regular schedule, such as, on a weekly schedule. The filter screen 310 can be removed and any debris can be washed off, if needed, and then reused. This screen maintenance should only be performed after the unit 100 has been placed in suspend, or a "hold" mode, and when there is no inlet sewage treatment demand on the unit 100. The active media in the internal basket can also be inspected and cleaned, or replaced, if needed.

The chlorine content of the discharged effluent (<0.5 mg/L) meets the requirements of IMO MEPC.227(64) and US 33 CFR Part 159 for effluent release to the marine environment without further processing. The dechlorinated effluent is environmentally safe and substantially free of residual chlorine. This final treated/dechlorinated effluent can substantially meet IMO MEPC.227(64) and US 33 CFR Part 159 discharge limits for $BOD_5$, COD, TSS, pH, Thermotolerant Coliform, Total Nitrogen (TN), and Total Phosphorus (TP).

The unit 100 can be designed to operate in an automatic mode with very little operator intervention. Based on sewage treatment demand, the unit 100 can initialize sewage transfer and begins treatment processing. A manual operation mode can be provided for troubleshooting and emergency pump out and/or flushing of the treatment system. In one aspect, the unit 100 can also be used in marine and offshore installations requiring permanent or long-term operation for the treatment of marine sewage.

The embodiments of the treatment unit of the invention have several advantages over conventional sewage treatment units. The hybrid treatment unit of the present invention involves the use of a conventional MBBR with a chip-like biological carrier media along with a novel advanced electrochemical/electrochlorination/electro-oxidation disinfection process via an in-situ sodium hypochlorite/disinfectant recirculation and an electrochemical advanced oxidation process (EAOP). Additionally, it involves processing sewage through an electrolytic cell having a slidable cover. The treatment unit further recirculates a chlorinated stream through an electrolytic cell to raise/increase its sodium hypochlorite concentration for disinfection. The treatment unit conveniently includes an onboard/in-situ recirculation chlorinator that can be utilized in a maintenance mode to clean the entire MBBR media carrier (and the unit itself) in the event a catastrophic failure of the MBBR occurs (this avoids storing of cleaning and treatment chemicals). The treatment unit can also incorporate an 'extended disinfection' mode where the produced sodium hypochlorite can be recirculated within the system even when there is no flow through-put of incoming wastewater to be treated. Additionally, the treatment unit can be configured to provide a wholly separate stream of in-situ electrochemical/electrochlorination/electro-oxidation process generated sodium hypochlorite/hypochlorous acid/disinfectant which can be used for surface disinfection purposes.

Therefore, the present invention is well adapted to attain the ends and advantages mentioned as well as those that are inherent therein. The previous description is not intended to limit the invention, which may be used according to different aspects or embodiments without departing from the scope thereof. The discussion of acts, materials, devices, articles and the like are included in this specification solely for the purpose of providing a context for the present invention. It is not suggested or represented that any or all of these matters formed part of the prior art base or were common general knowledge in the field relevant to the present invention.

Furthermore, the particular illustrative embodiments disclosed above may be altered or modified and all such variations are considered within the scope and spirit of the present invention. While systems and methods are described in terms of "comprising," "containing," or "including" various devices/components or steps, it is understood that the systems and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. If there is any conflict in the usages of a word or term in this specification, claims and one or more patent(s) or other documents that may be incorporated herein by reference, the definitions that are consistent with this specification should be adopted.

The invention claimed is:

1. A compact system for treating a stream of wastewater, the system comprising:
   a hybrid wastewater treatment unit, the treatment unit comprising:
   a first tank for receiving an inflow of the wastewater stream, the first tank comprising:
      a first chamber having a moving bed biofilm reactor (MBBR), the MBBR comprising a biological carrier media having a substantially high active surface area for biological microorganisms in the wastewater stream to attach, grow, and carry out a biological process for substantially reducing organic matter and total suspended solids (TSS) in the wastewater stream;

an electrolytic cell for generating an electrochlorinated/ electrochemical disinfectant, the electrolytic cell comprising:

a housing comprising a slidable cover;

a second tank in fluid communication with the first tank, the second tank comprising:

a first chamber; and a recirculation line communicating between the electrolytic cell and the first chamber of the second tank for continually recirculating a stream of the electrochlorinated/electrochemical disinfectant.

2. The system according to claim 1, wherein the wastewater treatment unit is in fluid communication with a wastewater storage tank.

3. The system according to claim 1, wherein the first chamber of the first tank further comprises an actuated sludge discharge valve for draining waste sludge produced during the biological process, wherein the waste sludge includes dead microorganisms.

4. The system according to claim 3, wherein the sludge is piped to a sludge storage tank or to a sludge processor.

5. The system according to claim 1, wherein the first tank includes a second chamber, and wherein the first tank further comprises a pipe configured to transport a process flow from the first chamber of the first tank to a base of the second chamber of the first tank to settle the TSS therein.

6. The system according to claim 5, wherein the second chamber of the first tank is fitted with a baffle plate for diverting a process stream comprising a substantially clarified effluent to the first chamber of the second tank.

7. The system according to claim 1, wherein the second tank includes a second chamber, and wherein the second tank further comprises a pipe configured to transport a process flow from the first chamber of the second tank to an upper surface of the second chamber of the second tank.

8. The system according to claim 7, wherein a filtration unit is installed within a mouth/opening to the second chamber of the second tank.

9. The system according to claim 8, wherein the filtration unit comprises a basket-like structure.

10. The system according to claim 9, wherein a filtration media is placed inside the basket-like structure.

11. The system according to claim 7, wherein the second chamber of the second tank comprises a level transmitter to monitor the inflow of the wastewater stream, and wherein the level transmitter is configured to commence and/or stop a treatment cycle.

12. The system according to claim 8, wherein the filtration unit further comprises a washable filter screen having a predetermined pore size, wherein the pore size is configured to entrap residual TSS in the process flow from the first chamber of the second tank to provide a substantially filtered water for discharge.

13. The system according to claim 12, further comprising a tank for storing a dechlorination/neutralization solution, and wherein an injection pump is configured to inject the dechlorination solution into the filtered water prior to discharge.

14. The system according to claim 1, wherein the housing comprises one or more integral locking grooves/slides configured to align the cover with the housing.

15. The system according to claim 1, wherein the housing comprises one or more stoppers for securing the cover substantially proximal to a base of the housing.

16. The system according to claim 1, wherein the housing comprises one or more closures to seal the cover to an outer body of the electrolytic cell.

17. The system according to claim 1, wherein the housing comprises a compartment for enclosing a plurality of electrodes.

18. The system according to claim 17, wherein the plurality of electrodes includes one bipolar electrode and two terminal electrodes.

19. A process for treating a stream of wastewater, comprising:

(A) providing a hybrid wastewater treatment unit, the treatment unit having:

a first tank for receiving an inflow of the wastewater stream, the first tank comprising: a first chamber having a MBBR, the MBBR comprising a biological carrier media having a substantially high active surface area for biological microorganisms in the wastewater stream to attach and carry out a biological process for substantially reducing organic matter and suspended TSS in the wastewater stream; and an electrolytic cell for generating an electrochlorinated/ electrochemically generated sodium hypochlorite/ disinfectant, the electrolytic cell comprising:

a housing comprising a slidable cover;

a second tank in fluid communication with the first tank;

(B) continually re-generating the electrochlorinated/electrochemically generated sodium hypochlorite/disinfectant by recirculating the electrochlorinated/electrochemically generated sodium hypochlorite/disinfectant between a first chamber of the second tank and the electrolytic cell via a recirculation line.

20. The process according to claim 19, further comprising monitoring an inflow of the wastewater stream, and wherein a treatment cycle is commenced and/or stopped when a predetermined setpoint is reached in a second chamber of the second tank.

21. The process according to claim 20, further comprising installing a filtration unit within a mouth/opening to the second chamber of the second tank, wherein the filtration unit is configured to entrap residual TSS in a process flow from the first chamber of the second tank to provide a substantially filtered water for discharge.

22. The process according to claim 21, further comprising neutralizing/dechlorinating the filtered water prior to discharge.

23. The process according to claim 19, further comprising diverting a first stream of the generated sodium hypochlorite/disinfectant to clean and disinfect the treatment unit.

24. The process according to claim 23, further comprising diverting a second stream of the generated sodium hypochlorite/disinfectant for disinfecting one or more surfaces.

25. The process according to claim 19, wherein the electrolytic cell continues generating the sodium hypochlorite/disinfectant and recirculating it for an adjustable time period even when no wastewater stream enters the treatment unit.

* * * * *